United States Patent
Olarig et al.

(10) Patent No.: US 11,656,770 B2
(45) Date of Patent: May 23, 2023

(54) SYSTEMS, METHODS, AND APPARATUS FOR SUPPORTING MULTIPLE CONNECTORS ON STORAGE DEVICES

(71) Applicant: Samsung Electronics Co., Ltd., Suwon-si (KR)

(72) Inventors: Sompong Paul Olarig, Pleasanton, CA (US); Yasser Zaghloul, San Mateo, CA (US)

(73) Assignee: SAMSUNG ELECTRONICS CO., LTD.

( * ) Notice: Subject to any disclaimer, the term of this patent is extended or adjusted under 35 U.S.C. 154(b) by 3 days.

(21) Appl. No.: 16/926,636

(22) Filed: Jul. 10, 2020

(65) Prior Publication Data

US 2021/0318815 A1 Oct. 14, 2021

Related U.S. Application Data

(60) Provisional application No. 63/010,041, filed on Apr. 14, 2020.

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
CPC .... G06F 3/0625; G06F 3/0659; G06F 3/0679; G06F 1/26; G06F 1/3287; G06F 1/3268; G06F 1/22; G06F 1/3221; G06F 1/3225; G06F 1/3275; G06F 3/0634; G06F 3/0655; Y02D 10/00
See application file for complete search history.

(56) References Cited

U.S. PATENT DOCUMENTS

| | | | |
|---|---|---|---|
| 5,748,684 A | | 5/1998 | Sanchez |
| 8,996,850 B2 | | 3/2015 | Huang et al. |
| 2003/0204757 A1 | * | 10/2003 | Flynn .................. G06F 1/24 713/300 |
| 2008/0040562 A1 | * | 2/2008 | Gower .................. G06F 1/3225 713/320 |
| 2010/0211765 A1 | | 8/2010 | Amidi et al. |
| 2010/0302893 A1 | * | 12/2010 | Sato .................... G11C 11/4072 365/227 |
| 2014/0281627 A1 | | 9/2014 | Stenfort |

(Continued)

*Primary Examiner* — Charles Rones
*Assistant Examiner* — Tong B. Vo
(74) *Attorney, Agent, or Firm* — Renaissance IP Law Group LLP

(57) ABSTRACT

A storage device may include a connector comprising a power management pin, a detector circuit configured to detect a transition of a power management signal received on the power management pin, and a power management circuit capable of configuring power to at least a portion of the storage device based, at least in part, on the detector circuit detecting a transition of the power management signal. The connector may further include a port enable pin, and the power management circuit may be configured to be disabled based, at least in part, on a state of the port enable pin. A storage device may include a connector comprising a power management pin, a nonvolatile memory, and a power management circuit configured to operate in a first power management mode based on determining a first state of the nonvolatile memory.

19 Claims, 5 Drawing Sheets

(56) References Cited

U.S. PATENT DOCUMENTS

| | | |
|---|---|---|
| 2015/0074300 A1 | 3/2015 | Wynn |
| 2016/0231958 A1* | 8/2016 | Chin ..................... G06F 3/0653 |
| 2016/0274648 A1 | 9/2016 | Chu |
| 2018/0032462 A1* | 2/2018 | Olarig ................. G06F 13/4068 |
| 2018/0239696 A1* | 8/2018 | Lim .................... G06F 12/0238 |
| 2019/0107881 A1 | 4/2019 | Powley |
| 2019/0278735 A1 | 9/2019 | Olarig |
| 2021/0019086 A1* | 1/2021 | Kim .................... G06F 12/0246 |
| 2021/0026560 A1* | 1/2021 | Pillai ..................... G11C 16/20 |
| 2021/0096773 A1* | 4/2021 | Seong ................... G11C 16/30 |
| 2021/0104283 A1* | 4/2021 | Chyan .................. G06F 1/3296 |
| 2021/0124409 A1* | 4/2021 | Karthikeyan ......... G06F 1/3253 |
| 2021/0224158 A1* | 7/2021 | Liu ....................... G06F 3/0658 |
| 2021/0278462 A1* | 9/2021 | Su .................... G01R 31/31907 |

\* cited by examiner

| Pin P3 (PWRDIS/ CLKREQ#) | Pin E25 (DualPortEn#) | Operation | |
|---|---|---|---|
| | | Configured as U.2 | Configured as U.3 |
| Low | Low | Dual port enabled<br>Power management disabled | Dual port enabled<br>Power management disabled |
| Low | High | Single port enabled<br>Power management disabled | Single port enabled<br>Power management disabled |
| High | Low | Dual port enabled<br>Power management disabled | Dual port enabled<br>Power management disabled |
| High | High | Single port enabled<br>Power management disabled | Single port enabled<br>Power management enabled<br>(Disabled based on low-to-high transition of PWRDIS pin) |

FIG. 3

SYSTEMS, METHODS, AND APPARATUS FOR SUPPORTING MULTIPLE CONNECTORS ON STORAGE DEVICES

CROSS-REFERENCE TO RELATED APPLICATIONS

This application claims priority to, and the benefit of, U.S. Provisional Patent Application Ser. No. 63/010,041 titled "Systems, Methods and Apparatus for Supporting Multiple Connectors on Storage Devices" filed Apr. 14, 2020 which is incorporated by reference.

TECHNICAL FIELD

This disclosure relates generally to storage devices, and more specifically to systems, methods, and apparatus for supporting multiple connectors on storage devices.

BACKGROUND

A storage device may be coupled to a host system through a connector. A connector may include a power management pin that may cause the storage device to configure power in response to a power management signal applied to the power management pin.

The above information disclosed in this Background section is only for enhancement of understanding of the background of the invention and therefore it may contain information that does not constitute prior art.

SUMMARY

A storage device may include a connector comprising a power management pin, a detector circuit configured to detect a transition of a power management signal received on the power management pin, and a power management circuit capable of configuring power to at least a portion of the storage device based, at least in part, on the detector circuit detecting a transition of the power management signal. The connector may further include a dual port enable pin, and the power management circuit may be configured to be disabled based, at least in part, on a state of the dual port enable pin. The storage device may further include a nonvolatile memory, and the power management circuit may be configured to be disabled or enabled, for example, by firmware, at least in part, on a state of the nonvolatile memory. The detector circuit may be configured to latch the power management pin based, at least in part, on the state of the nonvolatile memory. The power management pin may include a power disable pin, and the power management circuit may be capable of disabling power to at least a portion of the storage device based on the detector circuit detecting a transition of the power management signal.

A storage device may include a connector comprising a power management pin, a nonvolatile memory, and a power management circuit configured to operate in a first power management mode based on determining a first state of the nonvolatile memory. In the first power management mode, the power management circuit may configure power to at least a portion of the storage device based, at least in part, on a power management signal received on the power management pin. The storage device may further include a detector circuit configured to detect a transition of a power management signal received on the power management pin, and the power management circuit may disable power to at least a portion of the storage device based, at least in part, on the detector circuit detecting a transition of the power management signal. The connector may further include a dual port enable pin, and the power management circuit is configured to disable at least a portion of the storage device based, at least in part, on a state of the dual port enable pin. The storage device may be configured as a U.3 storage device in the first power management mode. The power management pin may include a power disable pin. The power management circuit may be configured to operate in a second power management mode based on determining a second state of the nonvolatile memory. In the second power management mode, the power management circuit may disable power to at least a portion of the storage device. The storage device may be configured as a U.2 storage device in the second power management mode.

A method may include coupling a storage device to a host through a connector, detecting a transition of a power management signal received from the host at the storage device through the connector, and configuring power to at least a portion of the storage device based, at least in part, on detecting the transition on the power management signal. Configuring power to at least a portion of the storage device may include disabling power to at least a portion of the storage device. The power to the at least a portion of the storage device may be configured based, at least in part, on the state of a nonvolatile memory. The method may further comprise latching the power management signal based on a reset signal. The power to the at least a portion of the storage device may be configured based, at least in part, on the state of a dual port enable signal received from the host at the storage device through the connector. The method may further include latching the dual port enable signal based on a reset signal.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 3 illustrates a truth table for an example embodiment of a storage device having transition detection and configurable power management according to this disclosure.

DETAILED DESCRIPTION

In some embodiments, a storage device may manage power within the device in response to detecting a transition on a power management signal received through a connector from the host. In some embodiments, detecting a transition on a power management signal may enable a storage device to be compatible with different host connectors having different pin definitions that may otherwise be incompatible. For example, a first host connector may have a power disable pin defined as an active low signal. A second host connector may use the same (or mechanically compatible) connector, but define the same power disable pin as an active high signal. This may cause a storage device designed for the second host connector to behave incorrectly (e.g., enter a power disable state) when plugged into the first host connector.

However, in some implementations of the first host connector, the power disable pin may always be pulled to the high state (e.g., it may not have any transitions), while in some implementations of the second host connector, the power disable signal is an active high and may have transitions from low to high states. Thus, by detecting a transition of the power disable signal, a storage device may distinguish between a valid power disable event on the second host connector, and the absence of a power disable event on the first host connector.

In some embodiments, a power management feature of a storage device may be configured in response to the state of a nonvolatile memory. For example, a storage device may have a power management circuit that may enable or disable power to at least a portion of the storage device in response to the state of a configuration bit in nonvolatile memory. In some embodiments, such a configurable power management feature may enable a single storage device to be programmed or configured, for example, for use with different types of host connectors.

The features described in this disclosure may have independent utility and may be embodied individually, and not every embodiment may utilize every feature. Moreover, the features may also be embodied in various combinations, some of which may amplify the benefits of the individual principles in a synergistic manner.

Some example embodiments of systems, processes, methods, and/or the like illustrating some possible implementation details according to this disclosure are described below. These examples are provided for purposes of illustrating the principles of this disclosure, but the principles are not limited to these embodiments, implementation details, and/or the like.

Figure 1:
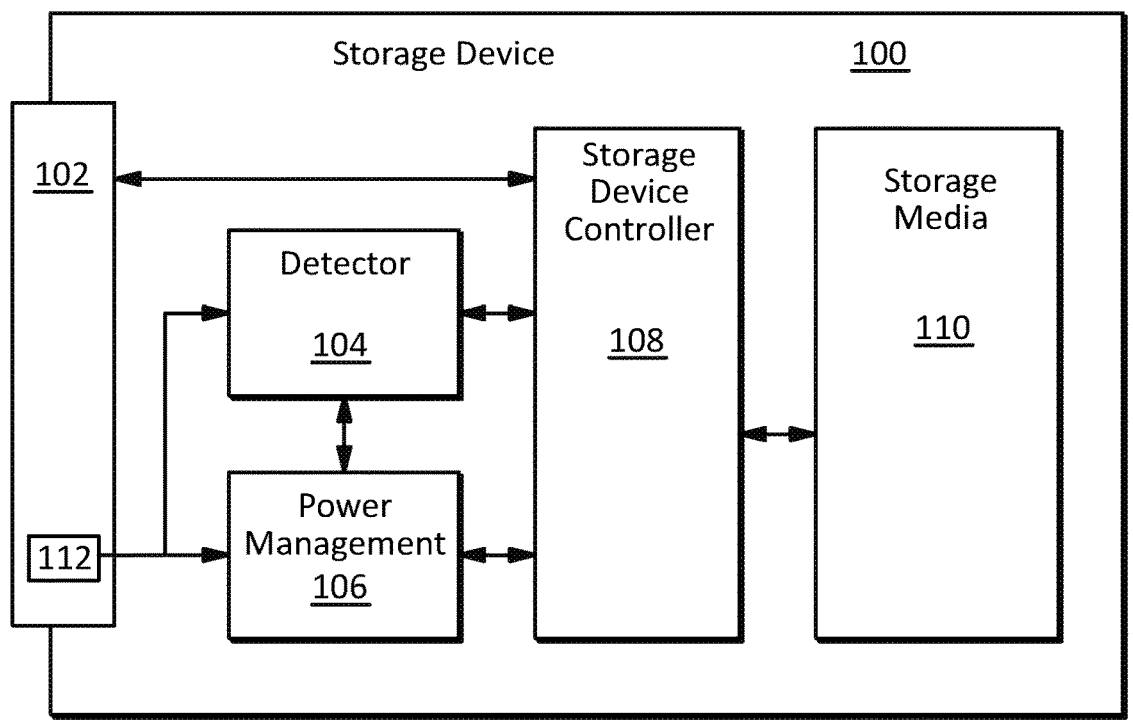
FIG. 1 illustrates an example embodiment of a storage device having a detector circuit according to this disclosure.

FIG. 1 illustrates an example embodiment of a storage device having a detector circuit according to this disclosure. The storage device 100 illustrated in FIG. 1 may include a connector 102, a detector circuit 104, a power management circuit 106, a storage device controller 108, and a storage media 110. The connector 102 may include a power management pin 112.

The connector 102 may be implemented with any type of standard or non-standard connector that may be used to connect a storage device to a host. Some examples may include connectors described in the SFF-8639 specification such as those known as U.2 and/or U.3 (SFF-TA-1001 specification) connectors, scalable connectors such as those described in the SFF-TA-1002 specification, M.2 connectors, any connectors that may be used with any storage interconnects such as those used with Serial Advanced Technology Attachment (SATA), Small Computer Systems Interface (SCSI), and/or Serial Attached SCSI (SAS), and/or the like, and/or any other connectors having any mechanical and/or electrical configuration and/or any configuration of pins.

The detector circuit 104 may be implemented with any analog and/or digital hardware, software, and/or any combination thereof, that may detect a transition in a power management signal received on the power management pin 112 as mentioned above. For example, in some embodiments in which the connector may be implemented as a U.3 connector, the detector circuit 104 may detect a low-to-high transition of the PWRDIS signal on pin P3 of the connector to recognize a valid power disable event as described in more detail below.

The power management circuit 106 may be implemented with any analog and/or digital hardware, software, and/or any combination thereof that may, for example, enable and/or disable or reduce power to all or any portions of the storage device 100. For example, the power management circuit 106 may include various power distribution and/or conditioning circuitry to receive power from a host through various additional pins of the connector 102 and distribute it throughout the storage device 100.

The storage medium 110 may be implemented with magnetic, solid state, optical, and/or any other type of data storage technology or combination thereof. Thus, the storage device 100 may be implemented as hard disk drive (HDD), a solid state drive (SSD), an optical disk drive (ODD), and/or any other type of storage device.

The storage device controller 108 may be implemented with any hardware, software, and/or any combination thereof that may control the storage and other functions of the storage device 100. For example, in some embodiments that may use flash memory such as Not-AND (NAND) memory as the storage media 110, the storage device controller 108 may include a flash translation layer (FTL).

The storage device 100 may include additional components and/or subcomponents and/or interconnections therebetween, not illustrated in FIG. 1. For example, some embodiments may include one or more communication interfaces, for example, network interfaces such as Ethernet, Fibre Channel, InfiniBand, and/or the like, storage or other interconnects and/or protocols such as Peripheral Component Interface Express (PCIe), SAS, SATA, Nonvolatile Memory Express (NVMe), NVMe Over Fabric (NVMe-oF), and/or the like, to interface the storage device controller and/or other components to various pins of the connector 102. As another example, some embodiments may include one or more computational components such as field programmable gate arrays (FPGAs), embedded graphics processing units (GPUs), and/or the like.

Although some components may be illustrated as individual components in FIG. 1, some or all of the components may be integrated into, and/or distributed between, other components.

Figure 2:
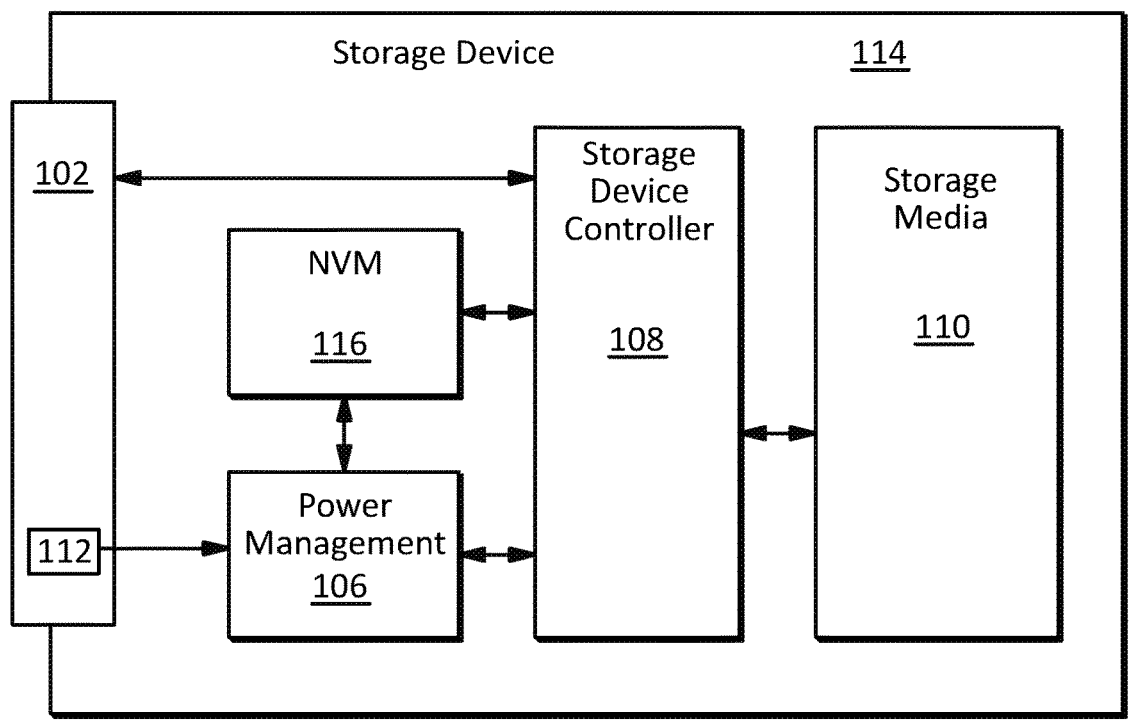
FIG. 2 illustrates an example embodiment of a storage device having configurable power management according to this disclosure.

FIG. 2 illustrates an example embodiment of a storage device having configurable power management according to this disclosure. The storage device 114 illustrated in FIG. 2 may include some components similar to those in the embodiment illustrated in FIG. 1 such as a connector 102 having a power management pin 112, a power management circuit 106, a storage device controller 108, and a storage media 110. However, the storage device 114 illustrated in FIG. 2 may also include a nonvolatile memory (NVM) 116 which may be used to configure and/or reconfigure any power management features of the storage device 114. For example, in some embodiments, the NVM 116 may be used to control the power management circuit 106 to enable or disable power to all or one or more portions of the storage device.

The NVM 116 may be implemented with any technique that may save the mode or configuration of any power management features of the storage device 114. Some examples may include one or more bits of read only memory (ROM), programmable read only memory (PROM), battery-backed random access memory (RAM), and/or flash memory, and/or the like. Some additional examples may include one or more fuses, cut traces, jumpers, dipswitches, headers, wires inserted or removed from a circuit board, and/or the like.

In some embodiments, and depending on the implementation details, configuring a power management feature based on a nonvolatile memory may enable a storage device to be configured and/or reconfigured anywhere along the supply chain, for example, by a manufacturer, distributor, user, and/or the like. For example, if the NVM is implemented with one or more bits of electrically reprogrammable memory such as flash memory, a manufacturer, distributor, user, and/or the like may reprogram the power management configuration of the storage device by accessing the flash memory through any technique such as, for example, a firmware update utility. Moreover, having configurable power management may improve economies of scale by enable a manufacturer to fabricate more devices of a single design and program them as different types of devices.

FIG. 3 illustrates a truth table for an example embodiment of a storage device having signal transition detection and configurable power management according to this disclosure. The embodiment illustrated with respect to FIG. 3 may be described in the context of storage devices that may be configured to enable a U.3 storage device to be used with a host having a U.2 connector, but the inventive principles are not limited to these example details.

In some embodiments, a U.2 host connector may be configured for use with the SATA Express specification which may define pin P3 of the connector as an active low clock request signal (CLKREQ #). When asserted (low), the CLKREQ # signal may cause a storage device plugged into the connector to enter a power disable state. In some embodiments, pin P3 of a U.2 host connector may be permanently pulled to a high logic level by the host to prevent a U.2 storage device plugged into the U.2 host connector from entering a power disable state. In some embodiments, pin P3 of a U.2 host connector may be pulled to a high logic level for a host that may be non SATA based (e.g., SAS or NVMe based) to disable the power disable feature by default.

In some embodiments, a U.3 host connector may be configured with pin P3 of the connector defined as an active high power disable signal (PWRDIS). Thus, if a U.3 storage device is plugged into a U.2 host connector, it may operate incorrectly by entering a power disable state in response to a high logic level on pin P3 of the connector. Thus, separate U.2 and U.3 storage devices may be used to provide correct operation with U.2 and U.3 host connectors. In some embodiments, and depending on the implementation details, this may increase the number of device types that a manufacturer, distributor, user, and/or the like may need to manufacture, stock, and/or the like.

Moreover, in some embodiments, a dual port feature of a storage device may further complicate the implementation of a power management feature. For example, in some embodiments, a power disable or other power management feature may be disabled when a storage device is configured for dual port operation. The power management may be disabled, for example, because dual port operation may be part of a high availability configuration which, in some implementations, may be inconsistent with a power disable state. Thus, having dual port enabled versions of each of the U.2 and/or U.3 versions of storage devices may further increase the number of device types that a manufacturer, distributor, user, and/or the like may need to manufacture, stock, and/or the like.

In some embodiments, and depending on the implementation details, a storage device having signal transition detection and configurable power management according to this disclosure may enable a single storage device to operate correctly in both U.2 and U.3 host connectors, while also enabling single port and dual port configurations with the same device.

For example, to implement the features illustrated in FIG. 3, an embodiment of a storage device may implement a detector circuit to detect a transition in the PWRDIS signal on pin P3 of a U.3 connector as shown in the embodiment illustrated in FIG. 1. Such an embodiment may also enable or disable a power disable circuit based on the programmed state of an NVM cell as shown in the embodiment illustrated in FIG. 2.

Referring again to FIG. 3, an embodiment of a storage device may operate as shown in the column labeled "operation" in response to the state of pin P3 and pin E25 depending on the programmed state of an NVM cell. Specifically, the NVM cell may be programmed to a first state to configure the storage device as a U.2 storage device. Alternatively, the NVM cell may be programmed to a second state to configure the storage device as a U.3 storage device. Pin E25 may be defined as an active low dual port enable signal (DualPortEn #) for both U.2 and U.3 device connectors and host connectors. Pin P3 may be defined as an active low clock request signal (CLKREQ #) when the storage device is configured as a U.2 device, and an active high power disable signal (PWRDIS) when the storage device is configured as a U.3 device.

Referring to the second row of FIG. 3 in which both of pins P3 (PWRDIS/CLKREQ #) and E25 (DualPortEn #) are low, the storage device may operate in dual port mode with power management disabled, regardless of whether the device is configured as a U.2 or U.3 device by the NVM cell. In some embodiments that may not be SATA based (e.g., SAS and/or NVMe based), the state of the NVM cell may be ignored, for example, because it may not be applicable. In some implementations, the pin P3 may be sampled during a low-to-high transition of a PCIe reset signal (PERST #).

Referring the third row of FIG. 3 in which pin P3 (PWRDIS/CLKREQ #) is low and E25 (DualPortEn #) is high, the storage device may operate in single port mode with power management disabled, regardless of whether the device is configured as a U.2 or U.3 connector by the NVM cell.

Referring to the fourth row of FIG. 3 in which pin P3 (PWRDIS/CLKREQ #) is high and E25 (DualPortEn #) is low, the storage device may operate in dual port mode with power management disabled, regardless of whether the device is configured as a U.2 or U.3 connector by the NVM cell.

Referring to the fifth row of FIG. 3 in which both of pins P3 (PWRDIS/CLKREQ #) and E25 (DualPortEn #) are high, the storage device may operate in single port mode regardless of whether the device is configured as a U.2 or U.3 device by the NVM cell. If the device is configured as a U.2 device, power management may be disabled. However, if the device is configured as a U.3 device, power management may be enabled, and the device may enter a power disable state in response to detecting a low-to-high transition of the PWRDIS signal.

Thus, in some embodiments, and depending on the implementation details, a storage device operating as illustrated in FIG. 3 may implement correct operation as a U.3 storage device when plugged into a U.3 host connector (e.g., proper implementation of power management in response to the PWRDIS signal), while still remaining operational (not entering a power disable state) when plugged into a U.2 host connector.

Figure 4:
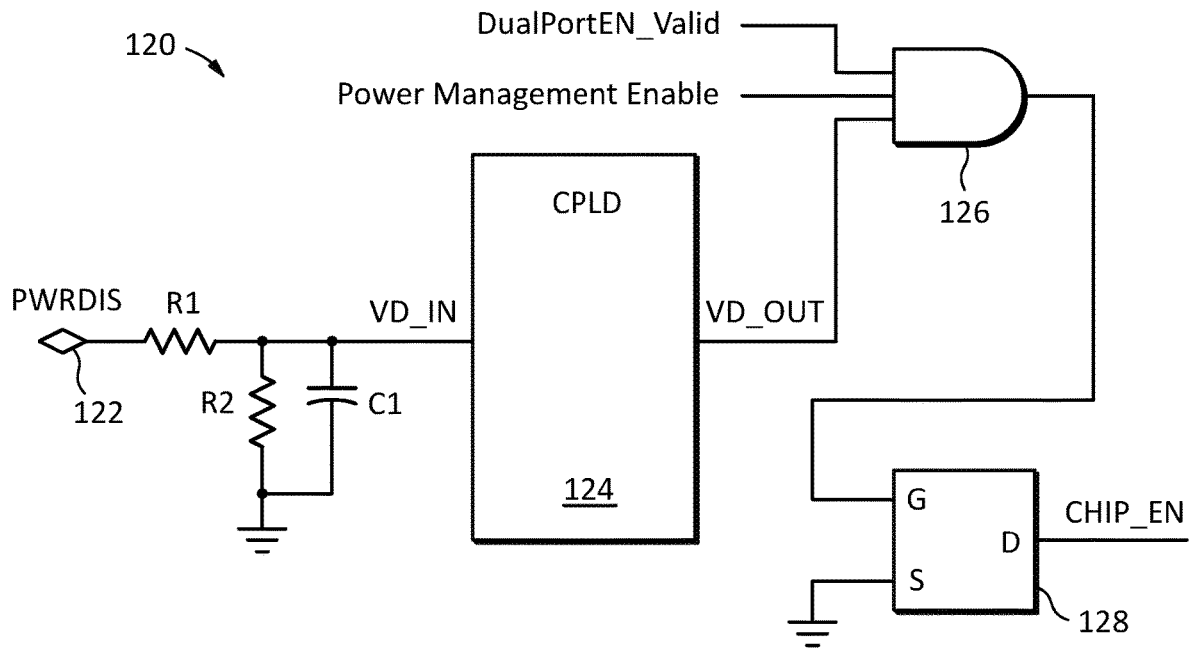
FIG. 4 illustrates an example embodiment of a detector circuit for a power disable signal for a storage device according to this disclosure.

FIG. 4 illustrates an example embodiment of a detector circuit for a power disable signal for a storage device according to this disclosure. The circuit 120 illustrated in FIG. 4 may include an input terminal 122 to receive a power disable input signal (PWRDIS) which may be filtered by a filter circuit including resistors R1, R2 and capacitor C1. The PWRDIS signal may be received, for example, from a power management pin on a connector (e.g., pin P3 on a U.3 connector). The filtered input signal VD_IN may pass through a complex programmable logic device (CPLD) 124 and be applied as VD_OUT to one input of a 3-input AND gate 126. The output of the AND gate may be applied to the G input of a D flip-flop 128, which may provide an output power enable signal (CHIP_EN). A power management enable/GPIO signal (Power Management Enable) may be applied to a second input of the 3-input AND gate 126, and a dual port enable valid signal (DualPortEN_Valid) may be applied to the third input of the 3-input AND gate 126.

In some embodiments, the input terminal 122, filter circuit, CPLD 124 and D flip-flop 128 may be part of an existing circuit in a storage device, for example, as part of the storage device controller 108 illustrated in FIG. 1. Thus, the detector circuit 120 illustrated in FIG. 4 may take the existing signal VD_OUT and qualify it with a power management enable signal and a dual port enable signal before it is latched by the flip-flop 128.

The CHIP_EN signal may disable power to all or some portions of the storage device. For example, the CHIP_EN signal may be applied as a gate signal to a power management circuit that may receive power from a host through pins of a connector and distribute it throughout the storage device.

The Power Management Enable signal may be generated, for example, by firmware in a storage device based on reading the state of a configuration bit in a register in NVM. Thus, in some embodiments, the Power Management Enable signal may enable the circuit 120 to be used to configure a storage device as a U.2 device or a U.3 device, for example, as illustrated in FIG. 3.

The DualPortEN_Valid signal may be generated, for example, by reading the state of a dual port enable pin on a connector (e.g., pin E25 on a U.3 connector), either directly or through an inverter. Alternatively, The DualPortEN_Valid signal may be generated, for example, by latching the state of a dual port enable pin on a connector in response to a reset signal as described in more detail below.

Thus, in some embodiments, the DualPortEN_Valid signal may provide a single port indication to the power management circuit which may be used to qualify pin P3 only if the storage device is in a single port configuration. In a dual port configuration, pin P3 may be ignored, for example, as illustrated in FIG. 3. As described with respect to FIG. 3, in some embodiments, a power disable feature may only be used for a single port configuration. For a dual port configuration, power disable may not be support, for example, because power disable may be inconsistent with high availability operation. Thus, in some embodiments, the AND gate 126 may only enable the PWRDIS signal to be latched by the flip-flop 128 when the storage device is operating in single port configuration.

Figure 5:
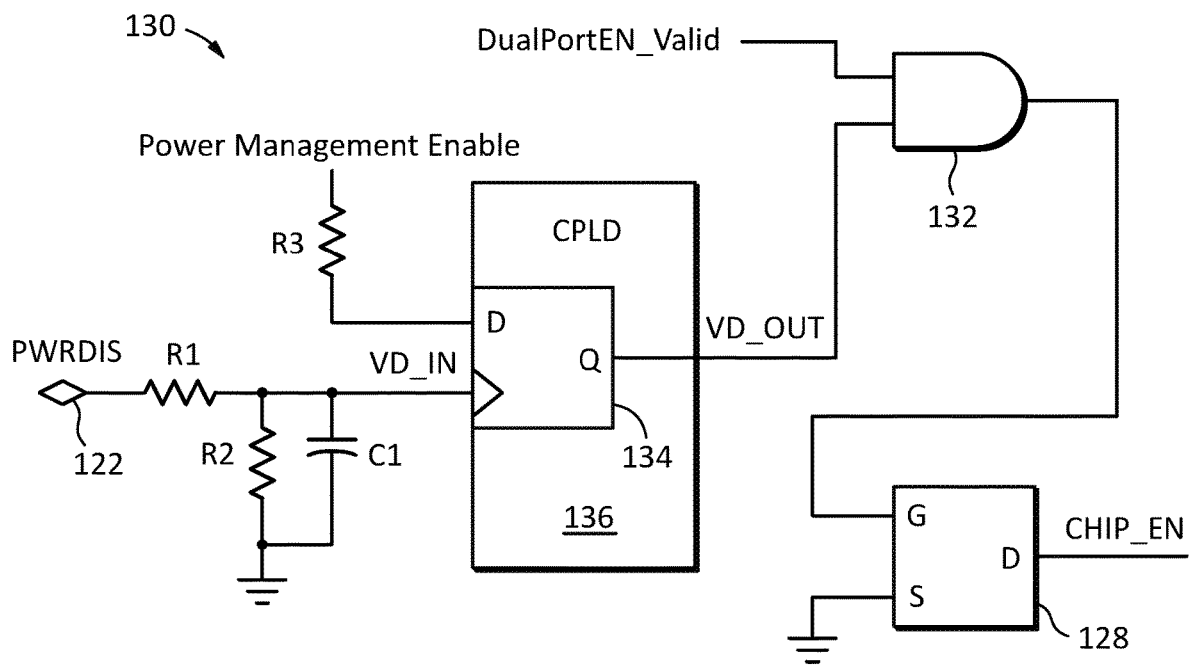
FIG. 5 illustrates another example embodiment of a detector circuit for a power disable signal for a storage device according to this disclosure.

FIG. 5 illustrates another example embodiment of a detector circuit for a power disable signal for a storage device according to this disclosure. The circuit 130 illustrated in FIG. 5 may include some components similar to those in the embodiment illustrated in FIG. 4. However, in the embodiment illustrated in FIG. 5, the AND gate 132 may be implemented as a 2-input AND gate, and the Power Management Enable signal may instead be applied to the D input of a D flip-flop 134 in the CPLD 136 through resistor R3. In this embodiment, the PWRDIS signal may be applied as the clock input to the flip-flop 134. Thus, the state of the Power Management Enable signal may be latched on a low-to-high transition of the PWRDIS signal, which may enable the circuit 130 to detect the low-to-high transition of the PWRDIS signal, which may be used to enter a power disable state, but qualified by the state of the Power Management Enable signal. Thus, when implemented in a U.3 storage device, the circuit 130 may enable the storage device to correctly determine that it is connected to a U.3 host connector, and therefore, to determine that high logic level on the PWRDIS pin signals a valid power disable event, as opposed to a constant high logic level on a U.2 host connector.

In some embodiments, and depending on the implementation details, either of the detector circuits 120 and/or 130 may be implemented, for example, as a dongle or add-on board which may be attached to an existing circuit board for a storage device. Thus, in some embodiments, an existing storage device may be converted to provide power management reconfiguration and/or correct power disable and/or dual port operation with relatively low impact on a manufacturing and/or modification operation. Moreover, in some embodiments, and depending on the implementation details, either of the detector circuits 120 and/or 130 may be integrated into new designs with little or no increase in costs, development time, and/or the like.

Figure 6:
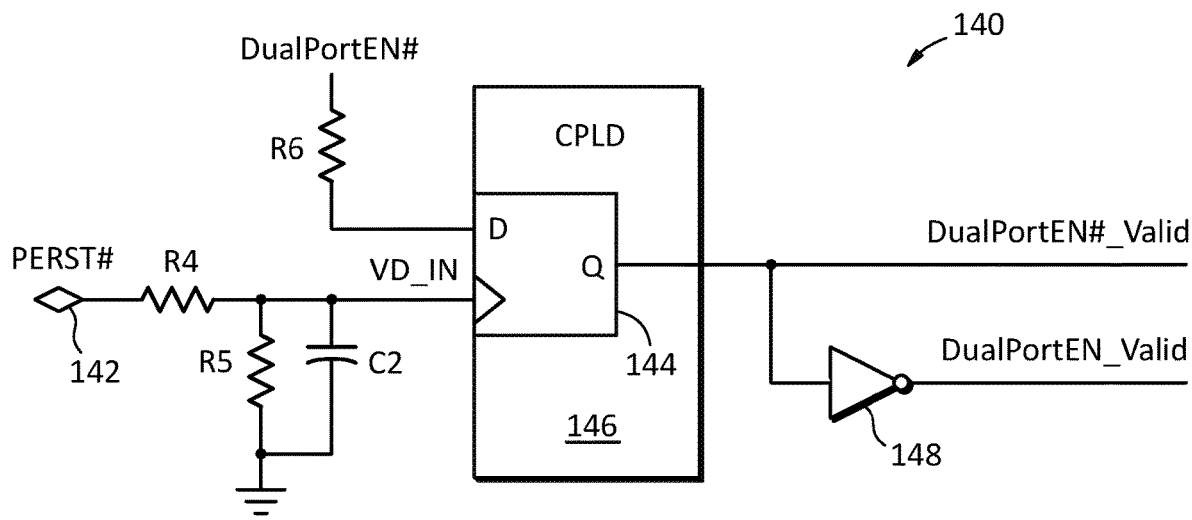
FIG. 6 illustrates an embodiment of a sampling circuit that may be used, for example, to generate a dual port enable valid signal according to this disclosure.

FIG. 6 illustrates an embodiment of a sampling circuit that may be used, for example, to generate a dual port enable valid signal according to this disclosure. The circuit 140 illustrated in FIG. 6 may include an input terminal 142 to receive an active low PCIe reset signal PERST #, for example from a pin of a connector. After being filtered by a filter circuit including resistor R4, R5 and capacitor C2, the PERST # signal may be applied to the clock input of a D flip-flop 144 in a CPLD 146. A dual port enable signal (DualPortEN #), for example, from a dual port enable pin on a connector (e.g., pin E25 on a U.2 or U.3 connector) may be applied as the D input to the flip-flop 144 through resistor R6. Thus, an active low DualPortEN #_Valid signal may be generated by latching the DualPortEN # signal in response to a low-to-high transition of the PERST # signal. A complementary DualPortEN_Valid signal may be provided through an inverter 148.

Figure 7:
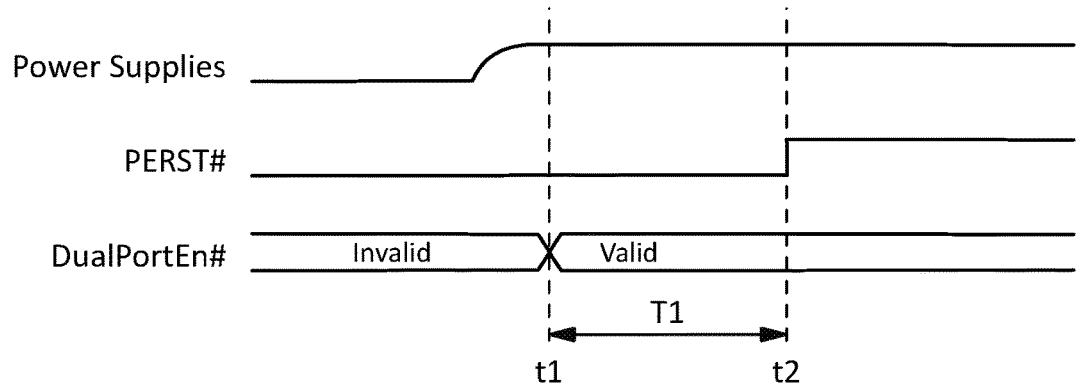
FIG. 7 illustrates a timing diagram of an example embodiment of a method for generating a dual port enable valid signal according to this disclosure.

FIG. 7 illustrates a timing diagram of an example embodiment of a method for generating a dual port enable valid signal according to this disclosure. The method illustrated in FIG. 7 may be used for example, at power-up with the sampling circuit illustrated in FIG. 6. Referring to FIG. 7, by time t1, one or more power supply rails may be stabilize, and the DualPortEN # signal may be valid. The state of the DualPortEN # signal may be latched at time t2 in response to activation of the active low PCIe reset signal PERST #. The time period T1 between times t1 and t2 may be specified, for example, based on a hold time for the DualPortEN # signal, a minimum time after the one or more power supply rails may be within a specified tolerance, and/or the like.

In some embodiments, a power management signal, for example, a power disable signal such as PWRDIS, may be latched in response to a reset signal such as a PCIe reset signal PERST #. In some embodiments, a power management signal may be latched using a sampling circuit similar to circuit 140 used for the dual port enable valid signal as shown in FIG. 6.

Figure 8:
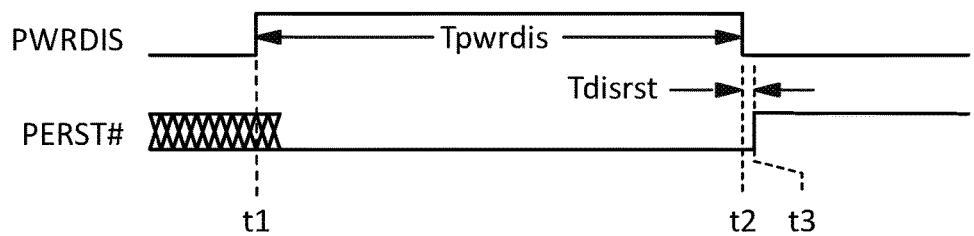
FIG. 8 illustrates a timing diagram of an example embodiment of a method timing for sampling a power disable signal according to this disclosure.

FIG. 8 illustrates a timing diagram of an example embodiment of a method timing for sampling a power disable signal according to this disclosure. The method may begin with an active high power disable signal PWRDIS at a low logic level and a PCIe reset signal PERST # in an indeterminate state. The PWRDIS signal may be driven to an active high state at time t1 and held in the active high state for a time period Tpwrdis until time t2 when the PWRDIS signal may be deactivated to the low state. The PERST # signal may be driven to an active low state at some point before the PWRDIS is deactivated at time t2. The PERST # signal may then be deactivated at time t3, which may occur after a hold time Tdisrst after the PWRDIS signal is deactivated at time t2.

The embodiments illustrated in FIGS. 6-8 may be beneficial for example, for providing defined and/or determinate behavior, and/or for purposes of compliance with specifications with embodiments of storage devices that may be used with scalable connectors such as those described in the SFF-TA-1002 specification and using signals as defined, for example, in the STT-TA-1009 specification.

Figure 9:
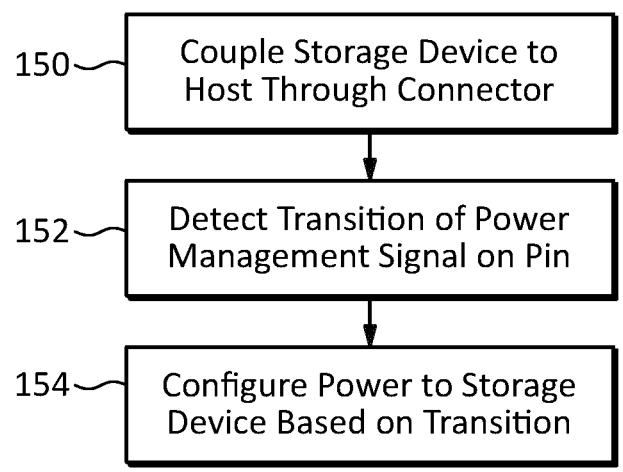
FIG. 9 illustrates an embodiment of a method for managing power in a storage device according to this disclosure.

FIG. 9 illustrates an embodiment of a method for managing power in a storage device according to this disclosure. The method may begin at operation 150 by coupling a storage device to a host through a connector. At operation 152 the method may detect a transition of a power management signal received from the host at the storage device through the connector. At operation 154, the method may configure power to at least a portion of the storage device based, at least in part, on detecting the transition on the power management signal.

The operations and/or components described with respect to the embodiment illustrated in FIG. 9, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

The embodiments disclosed above have been described in the context of various implementation details, but the principles of this disclosure are not limited these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not to indicate any spatial or temporal order unless apparent otherwise from context. In some embodiments, "based on" may refer to "based at least in part on." In some embodiments, "disabled" may refer to "disabled at least in part." A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
coupling a storage device to a host using a connector, wherein the connector comprises a first pin and a second pin;
detecting, using the first pin, a valid state of a power management signal received from the host at the storage device using the connector; and
configuring power to at least a portion of the storage device based, at least in part, on detecting the valid power management signal, wherein the detecting the valid state of the power management signal comprises detecting a first power management state of the power management signal and, based, at least in part, on the detecting the first power management state of the power management signal, detecting a second power management state of the power management signal;
configuring the storage device as a first type of device based, at least in part, on a state of a nonvolatile memory;
configuring the storage device to operate in a first power management mode based, at least in part, on a state of a port mode signal received from the host at the storage device using the second pin; and
configuring the storage device to operate in the first power management mode based, at least in part, on the state of the nonvolatile memory.

2. The method of claim 1, wherein the configuring power to the at least the portion of the storage device comprises modifying the power to the at least a portion of the storage device.

3. The method of claim 1, further comprising latching the valid power management signal based on a reset signal.

4. The method of claim 1, further comprising latching the mode signal based on a reset signal.

5. The method of claim 1, wherein the port mode signal comprises a port enable signal.

6. A storage device comprising:
a connector comprising a first pin;
a detector circuit configured to detect a valid state of a power management signal received on the first pin; and
a power management circuit arranged to configure a power to at least a portion of the storage device based, at least in part, on the detector circuit detecting the valid state of the power management signal;
wherein the detector circuit is configured to detect the valid state of the power management signal by detecting a first power management state of the power management signal and, based, at least in part, on the detecting the first power management state of the power management signal, detecting a second power management state of the power management signal;
wherein:
the connector further comprises a second pin;
wherein the second pin comprises a port mode pin; and
the storage device is configured to operate in a first power management mode based, at least in part, on a state of the second pin; and
wherein:
the storage device further comprises a nonvolatile memory;
the nonvolatile memory is arranged to configure the storage device as a first type of device based, at least in part, on a state of the nonvolatile memory; and
the storage device is configured to operate in the first power management mode based, at least in part, on the state of the nonvolatile memory.

7. The storage device of claim 6, wherein the detector circuit is configured to latch the first pin based, at least in part, on the state of the nonvolatile memory.

8. The storage device of claim 6, wherein:
the first pin comprises a power modification pin; and
the power management circuit is capable of modifying the power to the at least the portion of the storage device based on the detector circuit detecting the valid power management signal.

9. The storage device of claim 6, wherein the first pin comprises a power management pin.

10. The storage device of claim 6, wherein the second pin comprises a mode pin.

11. The storage device of claim 10, wherein the mode pin comprises a port enable pin.

12. The device of claim 6, wherein the port mode pin comprises a port enable pin.

13. A storage device comprising:
a connector comprising a first pin;
a nonvolatile memory;
a power management circuit arranged to configure power to at least a portion of the storage device based on determining a first state of a power management configuration portion of the nonvolatile memory, wherein the power management configuration portion of the nonvolatile memory is arranged to configure the storage device as a first type of device based, at least in part, on a state of the nonvolatile memory; and
a detector circuit configured to:
detect a valid state of a power management signal received on the first pin by detecting a first power management state of the power management signal and, based, at least in part, on the detecting the first power management state of the power management signal, detecting a second power management state of the power management signal; and
modify power to at least a portion of the storage device based, at least in part, on the detector circuit detecting the valid state of the power management signal;
wherein:
the connector further comprises a second pin;
the second pin comprises a port mode pin;
the storage device is configured to operate in a first power management mode based, at least in part, on a state of the second pin; and
the storage device is configured to operate in the first power management mode based, at least in part, on the state of the nonvolatile memory.

14. The storage device of claim 13, wherein the storage device is configured as a U.3 storage device in the first power management mode.

15. The storage device of claim 14, wherein the first pin comprises a power disable pin.

16. The storage device of claim 13, wherein the power management circuit is configured to operate in a second power management mode based on determining a second state of the nonvolatile memory.

17. The storage device of claim 16, wherein, in the second power management mode, the power management circuit modifies power to at least a portion of the storage device.

18. The storage device of claim 16, wherein the storage device is configured as a U.2 storage device in the second power management mode.

19. The device of claim 13, wherein the first pin comprises a power management pin.

* * * * *